(12) United States Patent
Gommé et al.

(10) Patent No.: US 11,502,728 B2
(45) Date of Patent: Nov. 15, 2022

(54) NEAR-FIELD WIRELESS DEVICE FOR DISTANCE MEASUREMENT

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 332 days.

(21) Appl. No.: 16/545,207

(22) Filed: Aug. 20, 2019

(65) Prior Publication Data

US 2021/0055134 A1 Feb. 25, 2021

(51) Int. Cl.
H04B 5/00 (2006.01)
G01D 5/20 (2006.01)
H04B 17/318 (2015.01)

(52) U.S. Cl.
CPC ......... *H04B 5/0043* (2013.01); *G01D 5/2066* (2013.01); *H04B 5/0081* (2013.01); *H04B 17/318* (2015.01)

(58) Field of Classification Search
None
See application file for complete search history.

(56) References Cited

U.S. PATENT DOCUMENTS

| 6,070,803 A * | 6/2000 | Stobbe | G01S 13/758 340/572.1 |
| 6,236,333 B1 * | 5/2001 | King | B60R 25/2036 340/10.1 |
| 6,650,226 B1 * | 11/2003 | Wuidart | G06K 7/0008 340/10.1 |
| 6,650,229 B1 * | 11/2003 | Wuidart | G06K 7/0008 340/10.2 |
| 8,710,966 B2 | 4/2014 | Hill | |
| 9,881,277 B2 | 1/2018 | Brady | |
| 2001/0015697 A1 * | 8/2001 | Wuidart | G06K 7/0008 340/8.1 |
| 2003/0164742 A1 * | 9/2003 | Wuidart | G06K 7/0008 331/117 R |
| 2005/0007296 A1 * | 1/2005 | Endo | H01Q 1/38 343/895 |
| 2006/0059056 A1 * | 3/2006 | Tsuchida | H03K 17/954 324/207.15 |

(Continued)

FOREIGN PATENT DOCUMENTS

EP 2077518 A1 7/2009

OTHER PUBLICATIONS

U.S. Appl. No. 16/439,884; not yet published; 38 pages (filed Jun. 13, 2019).

*Primary Examiner* — Gennadiy Tsvey

(57) ABSTRACT

One example discloses a wireless device, including: a first near-field device, including a near-field transmitter or receiver and a controller, configured to be coupled to a first conductive surface; wherein the near-field receiver includes a set of tuning values configured to either set a near-field resonance frequency or an operational bandwidth of the first near-field device; wherein the controller is configured to change at least one of the tuning values in response to a change in a distance between the first surface and a second conductive surface; and wherein the controller is configured to calculate the distance, between the first conductive surface and the second conductive surface, based on the at least one of the tuning values.

18 Claims, 8 Drawing Sheets

(56) References Cited

U.S. PATENT DOCUMENTS

| | | | | |
|---|---|---|---|---|
| 2007/0001814 A1* | 1/2007 | Steinke | ............... | G06K 7/0008 340/10.31 |
| 2009/0146892 A1* | 6/2009 | Shimizu | ............. | G06K 19/0726 307/104 |
| 2010/0304698 A1* | 12/2010 | Someya | .................... | H03J 3/20 455/193.1 |
| 2010/0328045 A1* | 12/2010 | Goto | ................. | G06K 7/10198 340/10.4 |
| 2011/0205133 A1* | 8/2011 | Fukasawa | .......... | G06K 19/0723 343/745 |
| 2012/0129477 A1* | 5/2012 | Someya | .................... | H03J 7/02 455/193.1 |
| 2012/0252362 A1* | 10/2012 | Kawata | ............... | H04B 5/0031 455/41.1 |
| 2013/0249750 A1* | 9/2013 | Matsui | ................... | H01Q 1/242 343/745 |
| 2014/0080416 A1* | 3/2014 | Seo | ................... | H04M 1/72454 455/41.2 |
| 2014/0127993 A1 | 5/2014 | Frankland | | |
| 2015/0303997 A1* | 10/2015 | Dhayni | ............. | G06K 7/10128 340/10.1 |
| 2015/0332072 A1* | 11/2015 | Herrick | ............. | G06K 7/10198 340/10.3 |
| 2017/0068437 A1* | 3/2017 | Warren | ............. | A44C 17/0233 |
| 2017/0324170 A1* | 11/2017 | Kerselaers | ........... | H01Q 1/2208 |
| 2018/0017695 A1* | 1/2018 | Wang | .................... | G01B 7/023 |
| 2019/0098435 A1* | 3/2019 | Zeng | ....................... | H04B 5/02 |

* cited by examiner

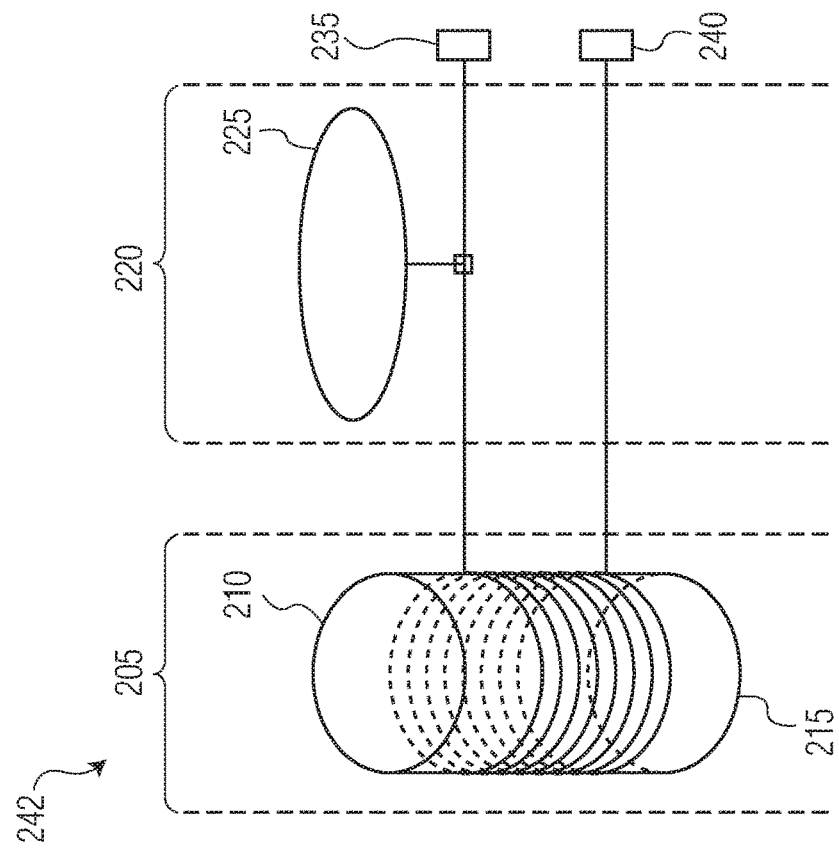
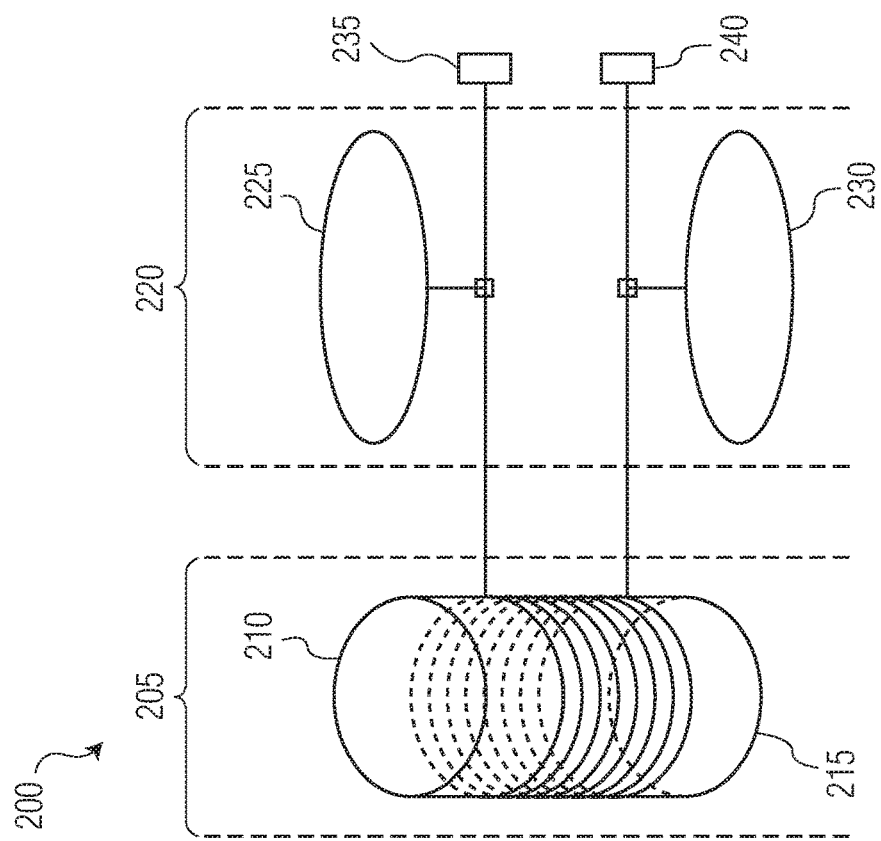

NEAR-FIELD WIRELESS DEVICE FOR DISTANCE MEASUREMENT

The present specification relates to systems, methods, apparatuses, devices, articles of manufacture and instructions for near-field wireless devices.

SUMMARY

According to an example embodiment, a wireless device, comprising: a first near-field device, including a near-field transmitter or receiver and a controller, configured to be coupled to a first conductive surface; wherein the near-field receiver includes a set of tuning values configured to either set a near-field resonance frequency or an operational bandwidth of the first near-field device; wherein the controller is configured to change at least one of the tuning values in response to a change in a distance between the first surface and a second conductive surface; and wherein the controller is configured to calculate the distance, between the first conductive surface and the second conductive surface, based on the at least one of the tuning values.

In another example embodiment, the tuning values include an adjustable capacitance configured to set a near-field resonance frequency of the first near-field device.

In another example embodiment, the adjustable capacitance magnitude decreases when the distance between the first surface and the second surfaces decreases; and the adjustable capacitance magnitude increases when the distance between the first surface and the second surfaces increases.

In another example embodiment, the tuning values include an adjustable resistance configured to set a transmitter or receiver bandwidth of the first near-field device.

In another example embodiment, the adjustable resistance magnitude decreases when the distance between the first surface and the second surfaces decreases; and the adjustable resistance magnitude increases when the distance between the first surface and the second surfaces increases.

In another example embodiment, the second conductive surface is not coupled to any other near-field device.

In another example embodiment, the controller calculates the distance without transmitting or receiving data to or from any other near-field device coupled to the second conductive surface.

In another example embodiment, the near-field device hosts non-propagating quasi-static electric near-field signals; and the first conductive surface is configured to conduct the non-propagating quasi-static electric near-field signals.

In another example embodiment, the near-field device is configured to transmit or receive a near-field electro-induction (NFEI) signal; and the near-field transmitter or receiver is configured to either set the near-field resonance frequency or the operational bandwidth of the NFEI signal.

In another example embodiment, the near-field transceiver is configured to transmit or receive a near-field electro-magnetic induction (NFEMI) signal; and the near-field transmitter or receiver is configured to either set the near-field resonance frequency or the operational bandwidth of the NFEMI signal.

In another example embodiment, the first conductive surface is either a user's body, a vehicle, or a robot.

In another example embodiment, the first conductive surface is a position on or proximate to an assembly line.

In another example embodiment, the controller is configured to record a set of the distances within a time period; and the controller is configured to output an authentication signal if the set of distances corresponds to a stored set of distances.

In another example embodiment, the authentication signal at least one of: activates an electronic device, permits entry to a secure space, indicates that a procedure has been correctly followed, and/or indicates that a quality assurance procedure has been performed.

In another example embodiment, the controller is configured to generate an acoustic signal having an amplitude and/or frequency modulated by the distance.

In another example embodiment, the controller is configured to generate a haptic signal having an amplitude, frequency and/or pattern thereof modulated by the distance.

In another example embodiment, the haptic signal is generated in response to a magnitude of the tuning values exceeding a threshold magnitude.

In another example embodiment, a second near-field device is coupled to the second conductive surface; the first near-field device is configured to receive a near-field signal having a received signal strength (RSS) from the second near-field device; the controller is configured to monitor the tuning values and the RSS; and the controller is configured to define physical contact between the first and second conductive surfaces as when an increase in a magnitude of the RSS corresponds with a drop in a magnitude of at least one of the tuning values.

In another example embodiment, the controller is configured to activate an authentication protocol in response to the defined physical contact; and the authentication protocol at least one of: activates an electronic device, permits entry to a secure space, indicates that a procedure has been correctly followed, and/or indicates that a quality assurance procedure has been performed.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 2A is a first example of a near-field antenna in the wireless device.

FIG. 2B is a second example of the near-field antenna in the wireless device.

Figure 1:
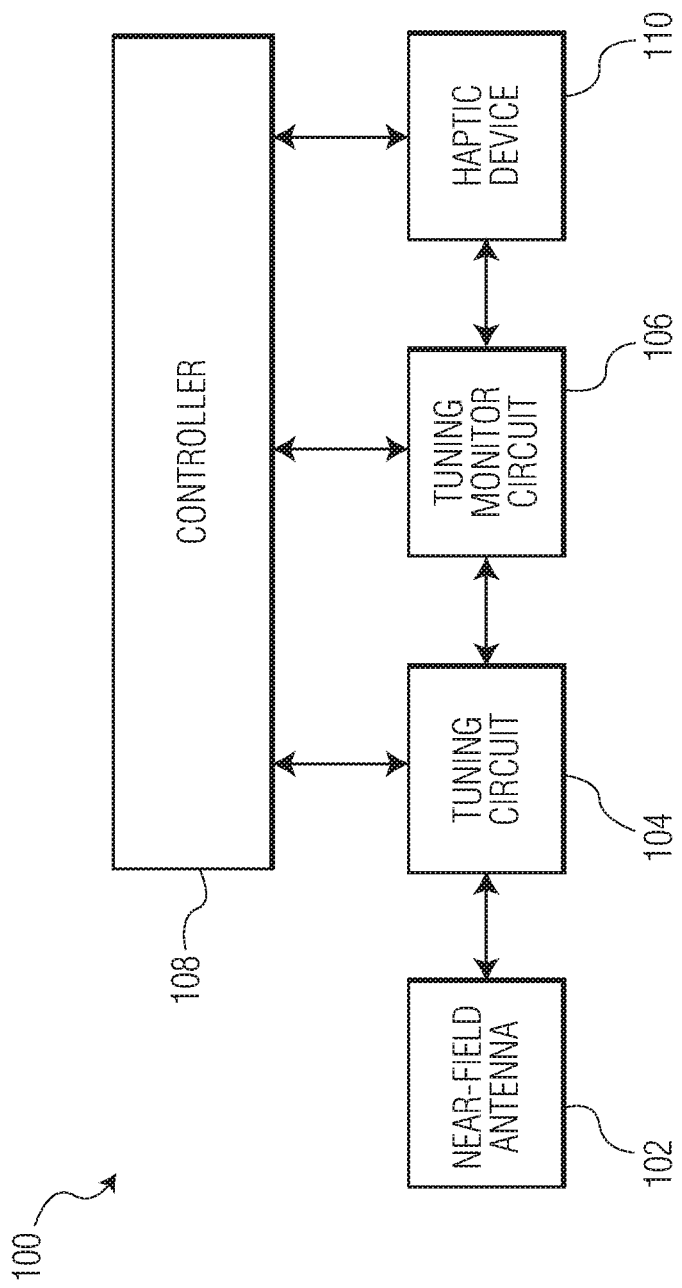
FIG. 1 is an example of a near-field wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device on a user's body, for example, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

In various operational settings a distance between such wireless and/or wearable near-field devices with respect to various other conductive surfaces in an environment or other near-field devices can be useful.

Now discussed are example near-field wireless devices that measure changes in the device's own internal tuning values when the near-field wireless device is sufficiently close to a conductive medium (e.g. a conductive surface). Discussed below are near-field wireless devices that makes use of the near-field coupling mechanisms (electrical and magnetic) to various surfaces, some of which are conductive, using the near-field device's own internal tuning values.

The near-field device's tuning values include capacitive bank adjustments for keeping the device's resonance frequency stable, and resistive bank adjustments for keeping the device's operational bandwidth/quality factor stable.

Changes in the tuning values are mapped to various movements (e.g. approaching or moving away from) of the near-field wireless devices with respect to various conductive surfaces and/or to each other, some of which may be worn by a user who's movements need to be carefully tracked as the user approaches and moves away from various objects in an environment (see below for example applications of this technique). In some example embodiment, the C-bank and R-bank tuning value increments have sufficient granularity and a sufficient update frequency (e.g. at least every 10-20 ms) to track a user's movements.

Thus the variations in the C-bank and R-bank tuning values correspond to a distance of the user's conductive surface(s) from another conductive surface(s). Such another conductive surface may or may not be coupled to a second near-field device.

Note, while example embodiments discussed herein refer to a "user", in alternate embodiments the near-field devices can be coupled to any conductive surface (e.g. a robot, a vehicle, a docking system, a physical coupling system, a position on an assembly line, etc.).

FIG. 1 is an example of a near-field wireless device 100. The example near-field wireless device 100 includes a near-field antenna 102, a transceiver/tuning circuit 104, a tuning monitor circuit 106, a controller 108, and a haptic device 110. Examples of the near-field antenna 102 are presented and discussed in FIGS. 2A and 2B. The transceiver/tuning circuit 104 is configured to adjust the device's 100 resonance frequency using a capacitive bank (C-bank) and bandwidth using a resistive bank (R-bank). The tuning monitor circuit 106 is configured to monitor the C-bank and R-bank values which are then passed to the controller 108.

The controller 108 is configured to adjust (e.g. increment/decrement) the transceiver/tuning circuit 104 C-bank and R-bank values. The controller 108 is also configured to receive the C-bank and R-bank values from the tuning monitor circuit 106 and calculate a distance of either the near-field wireless device 100 or a user (see FIG. 3 for an example user) coupled to the wireless device 100 from a conductive surface.

In some example embodiments the distance calculated by the controller 108 can be used to drive the haptic device 110. The haptic device 110 in some examples is coupled to the user (e.g. physical coupling, audio coupling, electrical coupling, etc.) to provide haptic feedback of some sort (e.g. a haptic signal having an amplitude, frequency and/or pattern thereof) as the user approaches, retreats from, or touches various conductive surfaces.

The five main types of haptic feedback technologies (haptics) are force, vibrotactile, electro-tactile, ultrasound and thermal feedback. The best-known example of haptic technology are the devices that create vibrations in a mobile phone classifying as vibrotactile feedback. Vibrotactile stimulators apply pressure to human skin receptors. Such haptic feedback enables users to feel clicks, vibrations and other tactile input providing the user with many kinds of touch sensations.

In some example embodiments, haptic feedback can be provided when a user is subjecting the near-field device 100 (e.g. a wearable) to an "unsupported" (e.g. an incorrectly worn near-field device and/or a loss of signal with other near-field devices) condition in which the near-field device's 100 performance degrades.

For example, in the case of an NFEMI wearable wristband, an unsupported condition is when the wristband containing the near-field device is not being worn correctly by a user. For example, if the device is not close enough to a conductive surface (such as the user's skin) the C-bank and R-bank values could be 130 pF and 5000 ohms to support the required resonance frequency (e.g. 10.3 MHz) and bandwidth (e.g. 400 KHz).

Another unsupported condition can be when the wristband is brought behind the user's back. At this location the tuning capacitor C-bank changes are significant (e.g. from a setting 66 to 42, which is 24 tuning steps), also the near-field device's 100 quality factor (e.g. bandwidth) is strongly decreased (resulting in R-bank tuning changes).

Such an unsupported condition, using haptic feedback driven by the C-bank and/or R-bank values, can notify the user to move their wrist with the wearable to a different location to re-establish communication with other near-field devices perhaps. This will improve the user's experience of an NFEMI communication link significantly without the need to have a functioning NFEMI link during the unsupported condition, using just the near-field device's 100 tuning values.

In other example embodiments, haptic feedback can be provided to alert a user in a hazardous/industrial environment as the user approaches or becomes too close to certain hazardous/industrial structures. For example, the haptic signal is generated in response to a magnitude of the C-bank and R-bank tuning values exceeding a threshold magnitude. Thus based on how close the user is to the conductive interface the level of haptic feedback can be varied (e.g. far from the surface results in a minor vibration, while very close by yields more intense vibration).

FIG. 2A is a first example of a near-field antenna 200 in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

FIG. 2B is a second example of a near-field antenna 242 in the wireless device 100. In this example the antenna 242 is also a near-field electromagnetic induction (NFEMI) antenna. In some example embodiments, the antenna 242 includes a coil (H-field) antenna 205 for magnetic fields, in conjunction with a short loaded monopole (E-field) antenna 220 for electric fields. The H-field antenna 205 includes a ferrite core 210 wound with wire 215. The E-field antenna 220 includes one conductive loading surface 225. Antenna 242 feed points 235, 240 are also coupled to various transceiver circuitry, such as a downstream radio transmitter and receiver integrated circuit (RF-IC), (not shown here).

Operation of the near-field wireless device 100 is further discussed in FIGS. 3-7 below.

Figure 3:
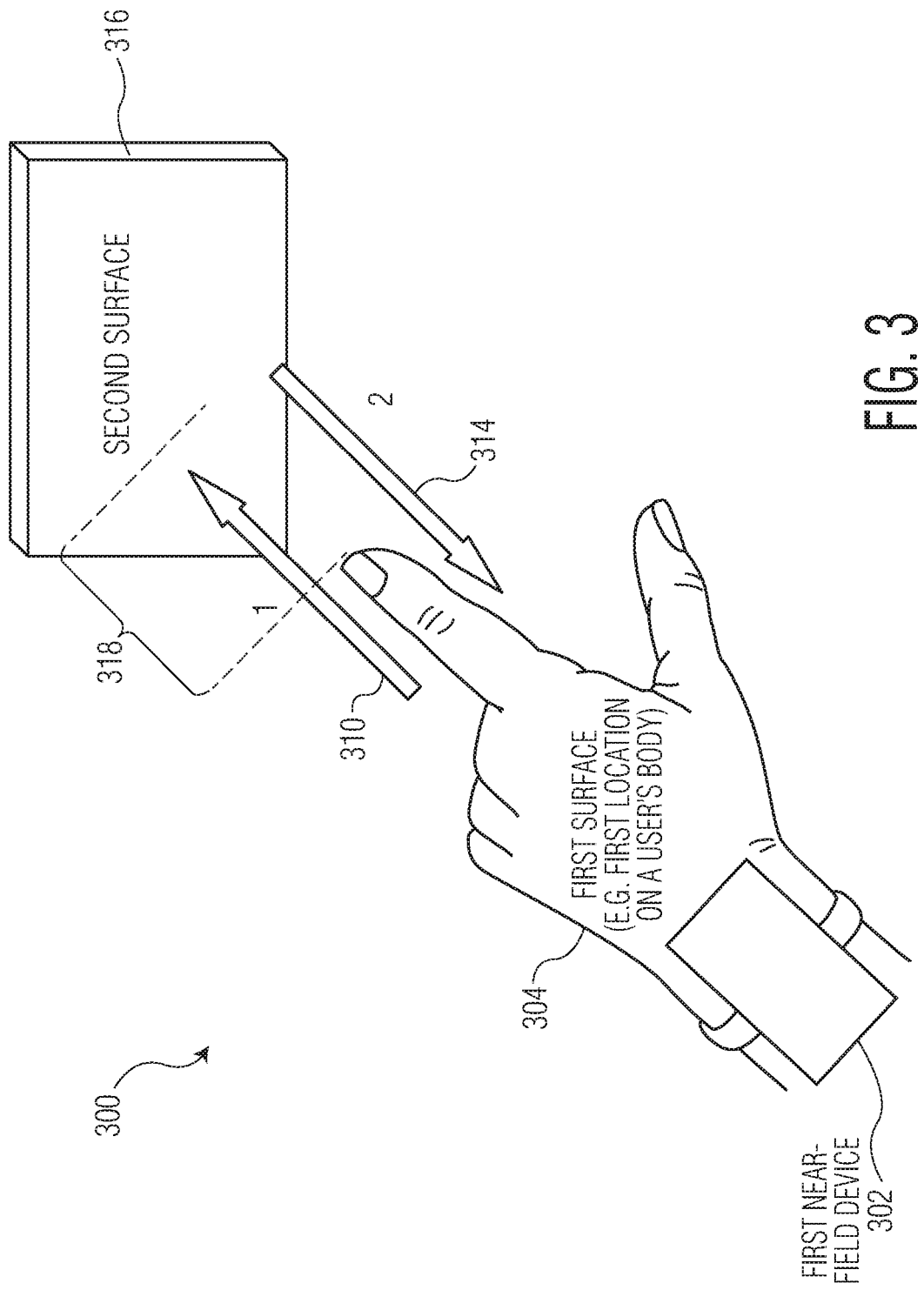
FIG. 3 is a first example of a first near-field device on a first surface moving with respect to a second surface.

FIG. 3 is a first example 300 of a first near-field device 302 on a first conductive surface 304 (e.g. a particular user's hand-finger configuration) moving with respect to a second conductive surface 316. In the example 300 movements are shown as an approaching (phase 1) 310 out of plane to the second surface 316, and a retreating (phase 2) 314 also out of plane to the second surface 316. At any moment in time a distance 318 of the first surface 304 (e.g. a user's finger) to the second surface 316 is shown.

Figure 4:
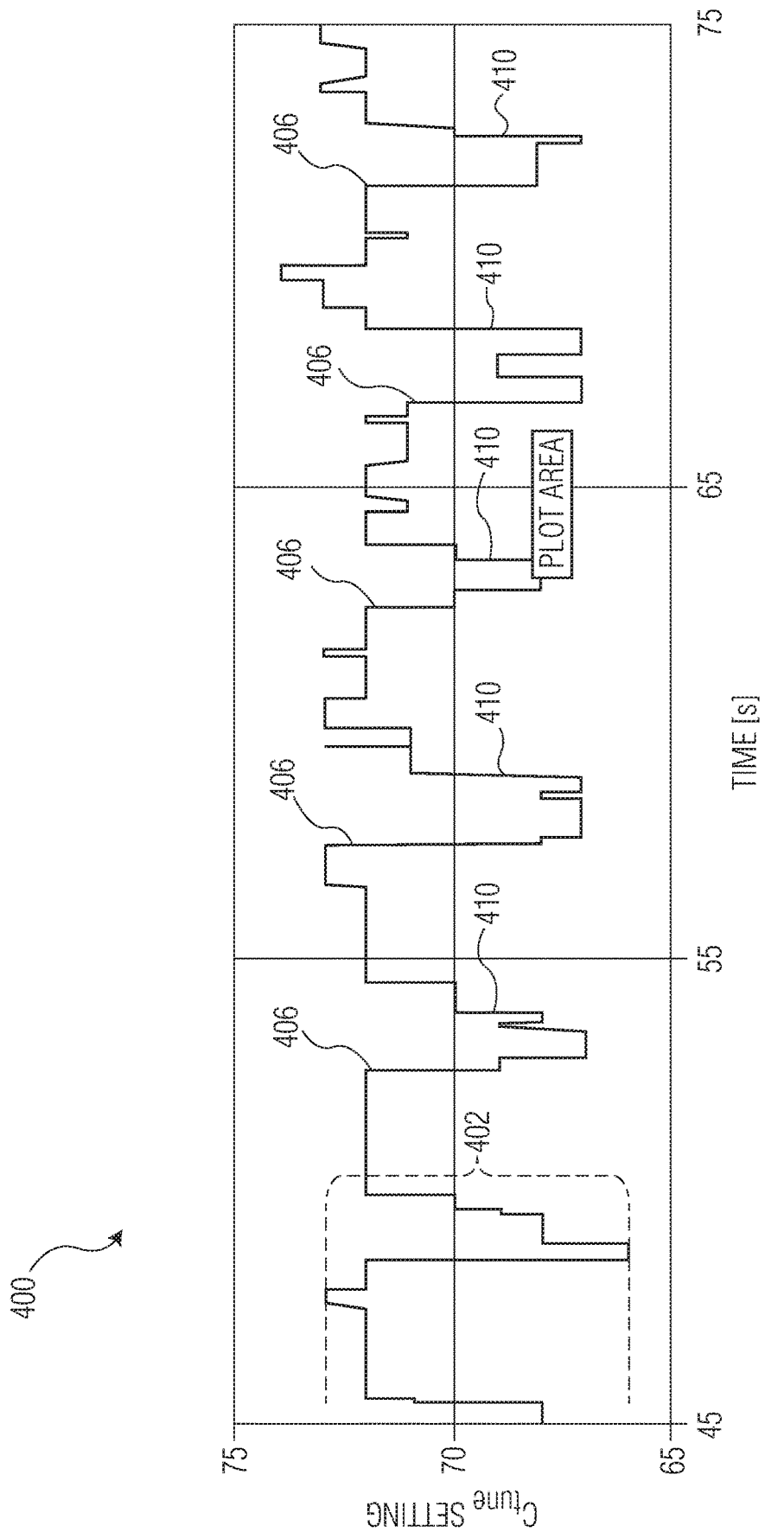
FIG. 4 is an example first set of capacitive (C-bank) tuning values for the first example of FIG. 3.

In this example 300 a user's finger on their left hand is approaching the second surface 316, then moving away from the conductive surface. This sequence of movements is repeated for 6 times, an example of which is shown in FIG. 4. As the user's finger approaches and moves away from the second surface 316, the controller 108 adjusts (e.g. increments/decrements) the transceiver/tuning circuit's 104 C-bank values and calculates the instantaneous distance 318 from these instantaneous C-bank values.

In some example embodiments, one of the conductive surfaces 225, 230 of FIGS. 2A and 2B faces a user's skin and the other is oriented towards the environment yielding a capacitance between this plate and the environment. Such a capacitance changes by the proximity of the conductive surfaces 225, 230 to various conductive surface, structures and/or objects in the environment such as the second surface 316. So the near-fields transmitted or received by the short-loaded dipole 220 in FIG. 2A or short-loaded monopole 220 in FIG. 2B will also be impacted by such proximate second surface 316, which will be measurable in the changing C-bank and R-bank values.

For example the C-bank magnitude decreases when the distance 318 between the first surface 304 and the second surface 316 decreases, and increases when the distance 318 between the first surface 304 and the second surface 316 increases (see FIG. 4).

In example embodiments of the first near-field device 302 that include a controller, the controller can be configured to record a set of distances within a time period, and output an authentication signal if the set of distances corresponds to a stored set of distances. In various example embodiments the authentication signal can: activate an electronic device, permit entry to a secure space, indicate that a procedure has been correctly followed, indicate that a quality assurance procedure has been performed, etc.

The controller can also be configured to output an boundary breached (e.g. alert, haptic, etc.) signal if the distance 318 is less than a predetermined distance 318. The boundary breached signal can cause an acoustic and/or haptic signal to be generated that has an amplitude and/or frequency modulated by the distance 318. The controller can also be configured to generate a visual cue modulated by the distance 318.

FIG. 4 is an example 400 first set of C-bank tuning values 402 for the first example 300 of FIG. 3. In this example 400 an approaching (phase 1) 310/406, and a retreating (phase 2) 314/410 are shown in the first set of C-bank tuning values 402 waveform. The x-axis is time in seconds and the y-axis is aggregate value of one or more tuning capacitor in the C-bank of the NFEMI device's transceiver circuit.

The C-bank tuning values 402 drop from a higher value to a lower value during the first surface's 304 (e.g. finger) approaching (phase 1) 310 toward the second surface 316 (i.e. the distance 318 decreases). The C-bank tuning values 402 then rise from the lower values to the higher values during the first surface's 304 (e.g. finger) retreating (phase 2) 314 from the second surface 316 (i.e. the distance 318 increases).

This example sequence of movements (i.e. approach, swipe, retreat) totals 30 seconds and is composed of distinct capacitor decreases, each approximately 0.9 seconds wide as the user's finger is moved toward and away from the conductive surface 316 six times (see waveforms). In Phase 1 310/406, when approaching the surface, the capacitor is decreasing from setting 72 to setting 68 approximately. In phase 2 314/410 when moving away from the surface the tuning capacitor value increases to the initial setting of 72.

In this example embodiment, the first set of C-bank tuning values 402 are generated wholly internal to the near-field device 302 in response to the near-field device's 302 proximity to the second surface 316.

Noise on the first set of C-bank tuning values 402 may be due to other conductive surfaces having an E-field coupling to the first surface 304 (e.g. user's hand/finger).

Figure 5:
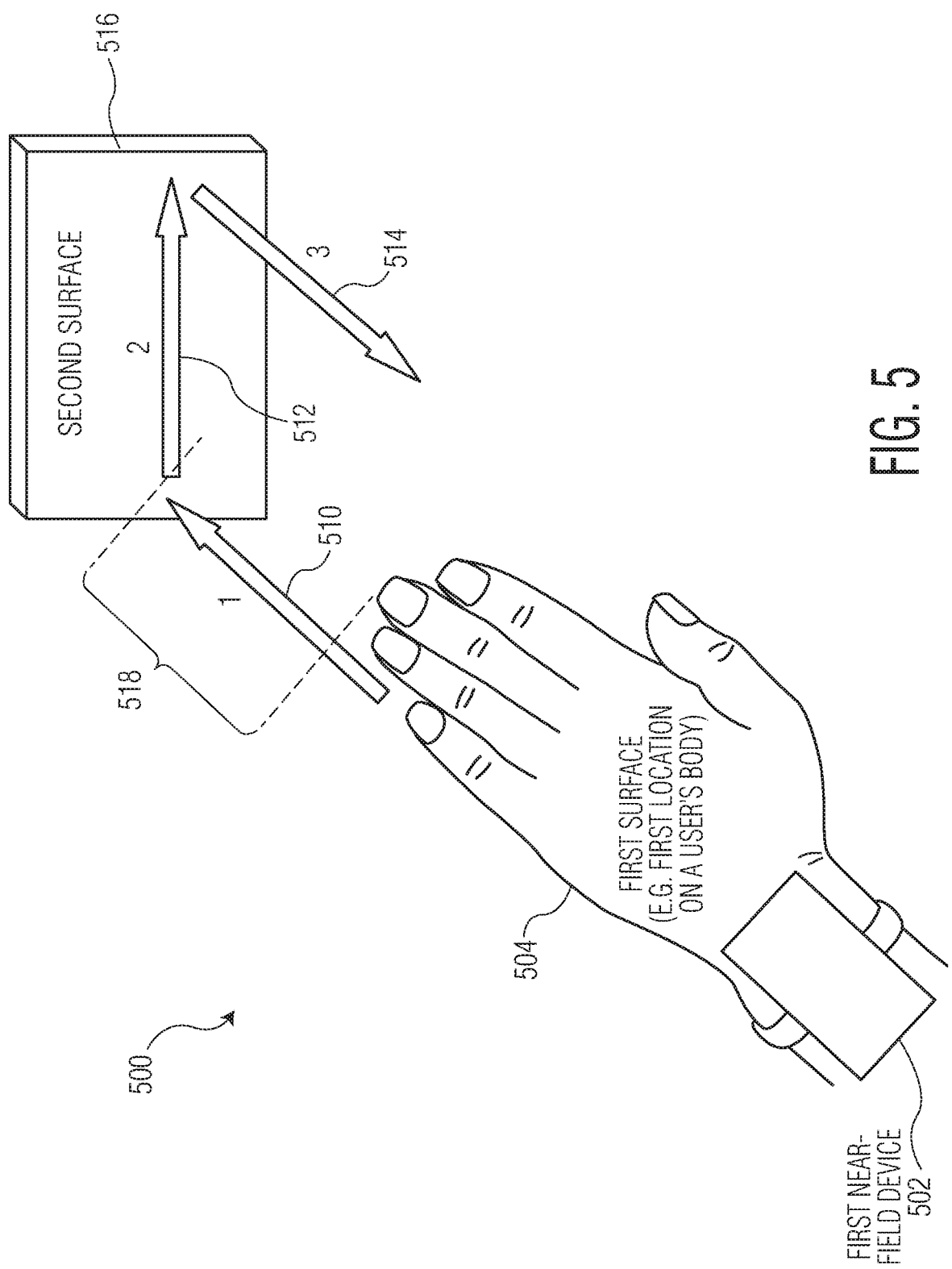
FIG. 5 is a second example of the first near-field device on the first surface moving with respect to the second surface.

FIG. 5 is a second example of the first near-field device 502 on the first surface 504 (e.g. at a user's wrist) moving with respect to the second surface 516. In the example 500 movements are shown as an approaching (phase 1) 510 out of plane to the second surface 516, a swiping (phase 2) 512 substantially parallel to the second surface 516 plane, and a retreating (phase 3) 514 also out of plane to the second surface 516. At any moment in time a distance 518 of the first surface 504 (e.g. a user's finger) to the second surface 516 is shown.

While the first near-field device 502 is shown attached to the user's left wrist (e.g. perhaps in a smartwatch), the near-field device 502 could instead attached to another position on the user's body such as a torso or foot.

In this example 500 a user's left hand is approaching a conductive surface (e.g. the second surface 516), then swiping very close to the conductive surface 516 from left to right before finally moving away from the conductive surface 516. This sequence of movements is repeated for 4 times, an example of which is shown in FIG. 6.

Figure 6:
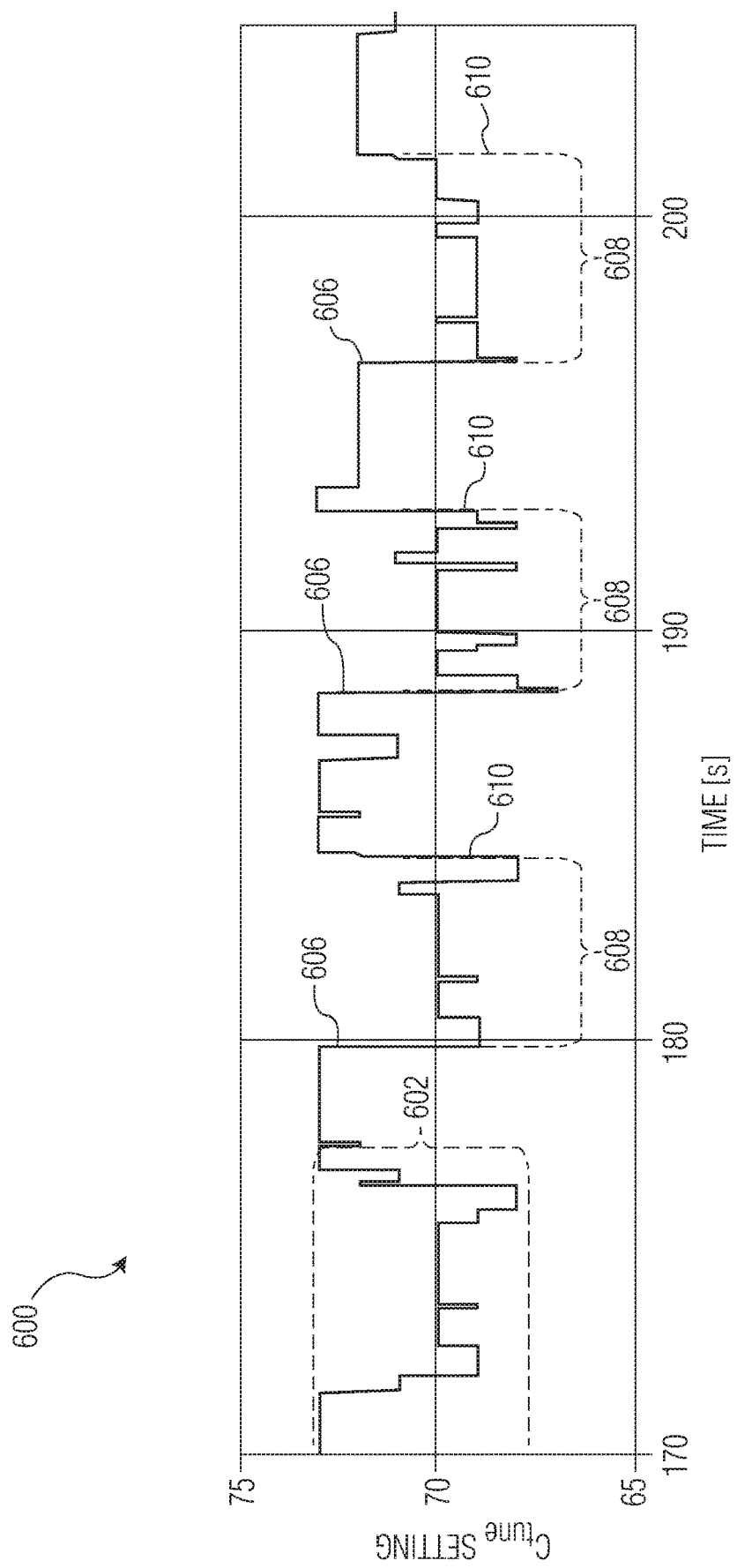
FIG. 6 is an example second set of capacitive (C-bank) tuning values for the second example of FIG. 5.

FIG. 6 is an example 600 second set of C-bank tuning values 602 for the second example 500 of FIG. 5. In this example 600 an approaching (phase 1) 606, a swiping (phase 2) 608, and a retreating (phase 3) 610 are shown in the second set of C-bank tuning values 602 waveform. Again, the x-axis is time in seconds and the y-axis is aggregate value of one or more tuning capacitor in the C-bank of the NFEMI device's transceiver circuit.

The sequence of 35 seconds is composed of distinct capacitor decreases, each approximately 3.3 seconds wide as the user's hand is moved toward and away from the conductive second surface 516 four times. In Phase 1 510/606, when approaching the surface, the capacitor is decreasing from setting 73 to setting 69 approximately. In phase 3 514/610 when moving away from the surface the tuning capacitor value increases to the initial setting of 73.

In this example embodiment, the second set of C-bank tuning values 602 are also generated wholly internal to the near-field device 502 in response to the near-field device's 502 proximity to the second surface 516.

While in the examples 300, 500 above the two near-field devices are on-body (i.e. on a user's body), in alternate embodiments the near-field device can be off-body (e.g. as in some example internet of things (IOT) applications).

Figure 7:
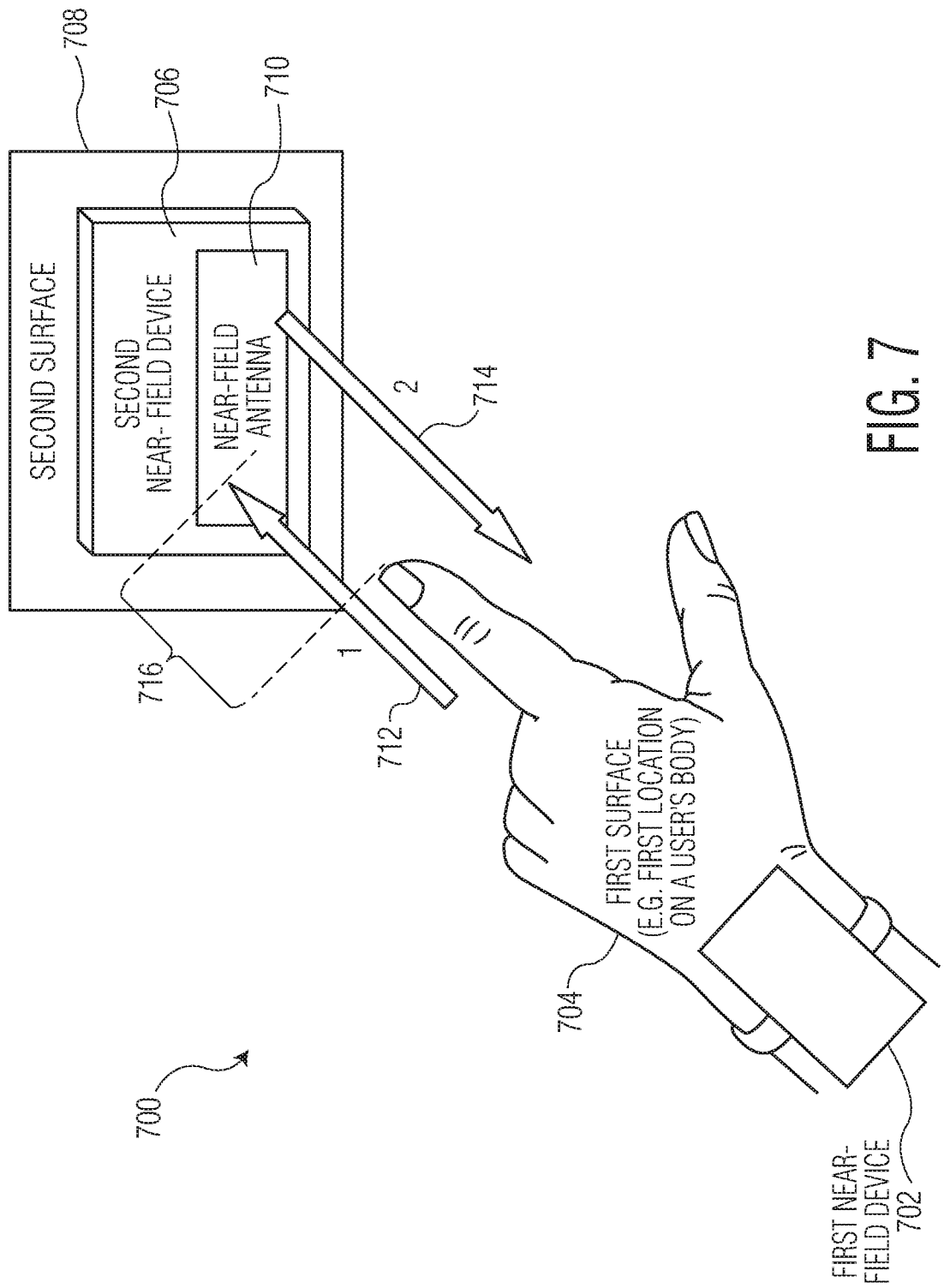
FIG. 7 is a third example of the first near-field device on the first surface moving with respect to a second near-field device now on the second surface.
Figure 8:
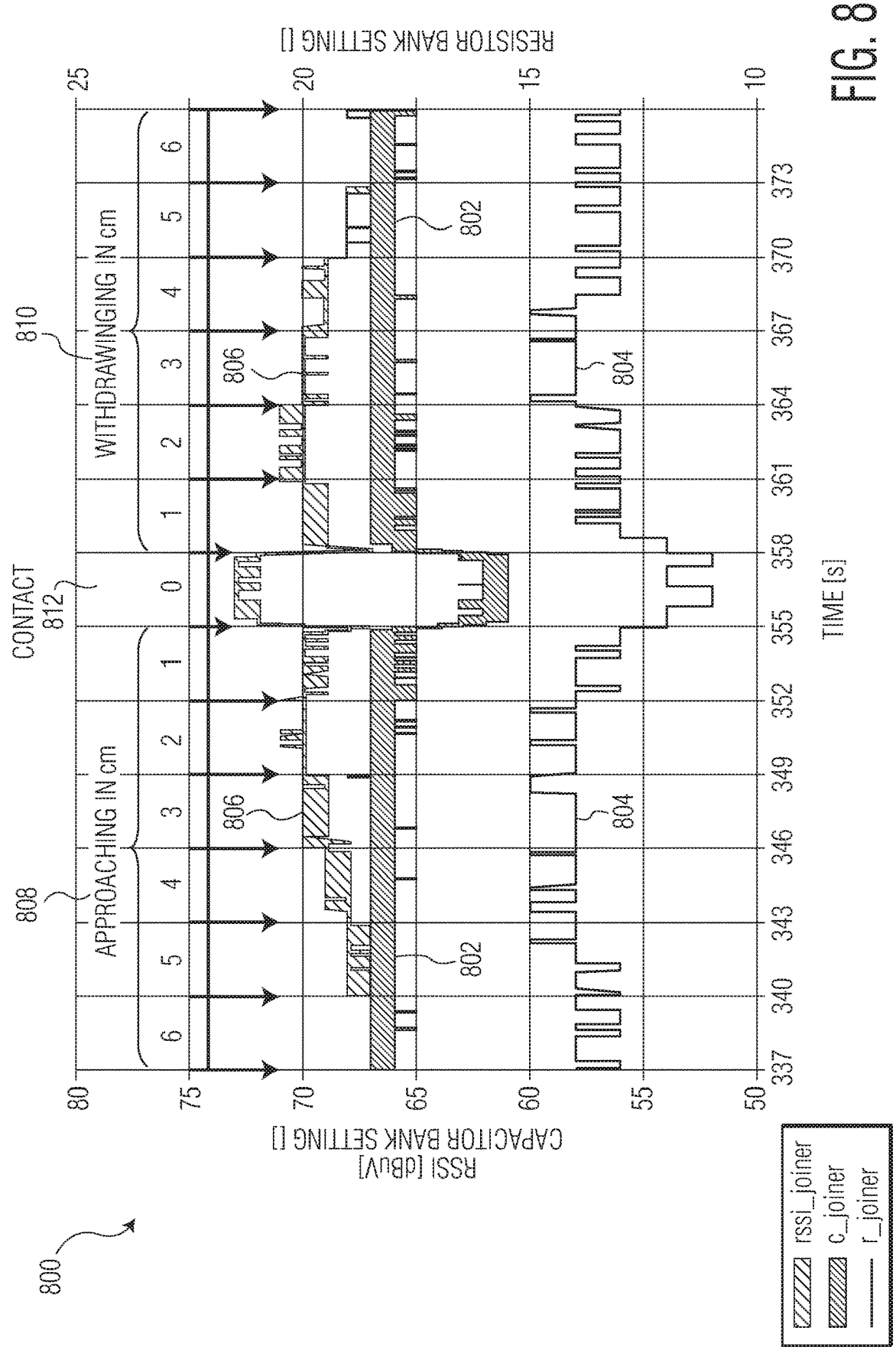
FIG. 8 is an example second set of capacitive (C-bank) and resistive (R-bank) tuning values plus received signal strength (RSS) values for the third example of FIG. 7.

FIG. 7 is a third example 700 of the first near-field device 702 on the first surface 704 moving with respect to a second near-field device 706 on the second conductive surface 708. A near-field antenna 710 of the second near-field device 706 is also shown. FIG. 8 is an example 800 set of capacitive (C-bank) 802 and resistive (R-bank) 804 tuning values plus received signal strength (RSS) values 806 of second near-field device 706 for the third example 700 of FIG. 7 (e.g. cm per cm (in 3 seconds intervals) from 6 cm distance to 0 (contact) and then withdrawing back to 6 cm distance). The approaching (phase 1) 808, retreating (phase 2) 810, and touching/contact 812 times are shown. FIGS. 7 and 8 are now discussed together.

The first near-field device 702 includes a conductive E-field antenna plate proximate to the user's wrist 704. The second near-field device 706 includes a conductive E-field antenna plate facing an ambient environment (e.g. attached to the second surface 708 such as a table with the E-field plate facing away from the table).

As the user's finger, at a distance 716 and coupled to the first near-field device 702, approaches (phase 1) 712/808 and then retreats (phase 2) 714/810 from the second near-field device 706, variations in the C-bank tuning values 802 and R-bank tuning values 804 are relatively stable at second near-field device 706; however, the received signal strength (RSS) values 806 between the two devices 702, 706 increases as they move closer together (see FIG. 8).

The RSS values 806 increase steadily up until a maximum RSS value when the user's finger contacts/touches the near-field antenna 710 (i.e. an E-field responsive second conductive plate) and the C-bank 802 and R-bank 804 values at second near-field device 706 show a distinct drop at contact/touch. Thus the controller 108 in the second near-field device 706 can detect exactly when a user wearing the first near-field device 702 contacts/touches the second near-field device 706 (e.g. an off-body touch). If the two near-field devices 702, 706 are in communication, the second near-field device's 706 detection of exactly when the user wearing the first near-field device 702 contacts/touches the second near-field device 706 can be communicated back to the first near-field device 702.

In some example embodiments the controller is configured to define physical contact between the first and second conductive surfaces as when an increase in a magnitude of the RSS corresponds with a drop in a magnitude of at least one of the tuning values. "Defined physical contact" is herein defined as including "actual physical contact" but also including examples where the first and second conductive surfaces are sufficiently close but not actually touching.

Using the first near-field device 702 and the second near-field device 706, applications such as smart locks can be enabled. For example, a user wearing the first near-field device 702 wants to enter a room having the second near-field device 706 (e.g. a smart lock at the door to the room). By monitoring the C-bank 802, R-bank 804, and RSS 806 values, the user's time of touching the near-field antenna 710 on the second near-field device 706 can be detected. Additionally, since there can be a near-field (NFEI/NFEMI) link present before, during and right after touching, the link can also host an authentication protocol that unlocks the door once the user touch is detected.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless device, comprising:
    a first near-field communications device, including a near-field transmitter, a near-field receiver and a controller, configured to be coupled to a first conductive surface;
    wherein the near-field device includes an adjustable capacitance tuning value specifically configured to set a near-field resonance frequency of the first near-field transmitter and the near-field receiver;
    wherein the near-field transmitter is configured to transmit near-field signals and the near-field receiver is configured to receive near-field signals;
    wherein the controller is configured to change the adjustable capacitance tuning value in order to keep the near-field resonance frequency constant when a distance between the first conductive surface and a second conductive surface changes; and
    wherein the controller is configured to use the adjustable capacitance tuning value to calculate the distance, between the first conductive surface and the second conductive surface, such that changes in the distance that is calculated correspond to changes in the adjustable capacitance tuning value.

2. The device of claim 1:
    wherein a magnitude of the adjustable capacitance tuning value is configured to decrease when the distance between the first conductive surface and the second conductive surface decreases; and
    wherein the magnitude is configured to increase when the distance between the first conductive surface and the second conductive surface increases.

3. The device of claim 1:
further comprising an adjustable resistance configured to set a bandwidth of the near-field transmitter and the near-field receiver.

4. The device of claim 3:
wherein the adjustable resistance magnitude decreases when the distance between the first conductive surface and the second conductive surface decreases; and
wherein the adjustable resistance magnitude increases when the distance between the first conductive surface and the second conductive surface increases.

5. The device of claim 1:
wherein the second conductive surface is not coupled to any other near-field device.

6. The device of claim 1:
wherein the controller calculates the distance without transmitting or receiving data to or from any other near-field device coupled to the second conductive surface.

7. The device of claim 1:
wherein the near-field signal is a non-propagating quasi-static electric near-field signal; and
wherein the first conductive surface is configured to conduct the non-propagating quasi-static electric near-field signal.

8. The device of claim 1:
wherein the near-field signal is a near-field electro-induction (NFEI) signal; and
wherein the near-field transmitter or receiver is configured to either set the near-field resonance frequency or a bandwidth of the wireless device.

9. The device of claim 1:
wherein the near-field signal is a near-field electro-magnetic induction (NFEMI) signal; and
wherein the near-field transmitter or receiver is configured to either set the near-field resonance frequency or a bandwidth of the wireless device.

10. The device of claim 1:
wherein the first conductive surface is either a user's body, a vehicle, or a robot.

11. The device of claim 1:
wherein the first conductive surface is a position on or proximate to an assembly line.

12. The device of claim 1:
wherein the controller is configured to record a set of the distances within a time period; and
wherein the controller is configured to output an authentication signal if the set of distances corresponds to a stored set of distances.

13. The device of claim 12:
wherein the authentication signal at least one of: activates an electronic device, permits entry to a secure space, indicates that a procedure has been correctly followed, and/or indicates that a quality assurance procedure has been performed.

14. The device of claim 1:
wherein the controller is configured to generate an acoustic signal having an amplitude and/or frequency modulated by the distance.

15. The device of claim 1:
wherein the controller is configured to generate a haptic signal having an amplitude, frequency and/or pattern thereof modulated by the distance.

16. The device of claim 15:
wherein the haptic signal is generated in response to a magnitude of the tuning value exceeding a threshold magnitude.

17. The device of claim 1, wherein a second near-field device is coupled to the second conductive surface;
wherein the first near-field device is configured to receive a near-field signal having a received signal strength (RSS) from the second near-field device;
wherein the controller is configured to monitor the adjustable capacitance tuning value and the RSS; and
wherein the controller is configured to define physical contact between the first and second conductive surfaces as when an increase in a magnitude of the RSS corresponds with a drop in a magnitude of the adjustable capacitance tuning value.

18. The device of claim 17:
wherein the controller is configured to activate an authentication protocol in response to the defined physical contact; and
wherein the authentication protocol at least one of: activates an electronic device, permits entry to a secure space, indicates that a procedure has been correctly followed, and/or indicates that a quality assurance procedure has been performed.

* * * * *